(12) United States Patent
Blot et al.

(10) Patent No.: US 9,189,725 B2
(45) Date of Patent: Nov. 17, 2015

(54) ACTIVATION AND INDICATION OF AN RF FIELD ON A DEVICE INCLUDING A CHIP

(75) Inventors: Philippe Blot, Plaisir (FR); Didier Mobetie, Versailles (FR); Jean-Charles Renaud, Fontenay-les-Briis (FR)

(73) Assignee: UINT, Orsay (FR)

( * ) Notice: Subject to any disclaimer, the term of this patent is extended or adjusted under 35 U.S.C. 154(b) by 266 days.

(21) Appl. No.: 13/513,439

(22) PCT Filed: Dec. 2, 2010

(86) PCT No.: PCT/FR2010/052601
§ 371 (c)(1),
(2), (4) Date: Jun. 1, 2012

(87) PCT Pub. No.: WO2011/067543
PCT Pub. Date: Jun. 9, 2011

(65) Prior Publication Data
US 2012/0241524 A1    Sep. 27, 2012

(30) Foreign Application Priority Data

Dec. 3, 2009    (FR) ..................... 09 58645

(51) Int. Cl.
| | | |
|---|---|---|
| *G06K 19/06* | (2006.01) | |
| *G06K 19/073* | (2006.01) | |
| *G06K 7/10* | (2006.01) | |
| *G06K 19/07* | (2006.01) | |

(52) U.S. Cl.
CPC ...... *G06K 19/07345* (2013.01); *G06K 7/10128* (2013.01); *G06K 7/10237* (2013.01); *G06K 19/0723* (2013.01); *G06K 19/07354* (2013.01)

(58) Field of Classification Search
USPC ............ 235/487, 492; 340/10.1, 572.2, 572.4
See application file for complete search history.

(56) References Cited

U.S. PATENT DOCUMENTS

| | | | |
|---|---|---|---|
| 8,015,592 B2* | 9/2011 | Doughty et al. ................... 726/2 |
| 2003/0030448 A1* | 2/2003 | Sapir ............................. 324/536 |
| 2006/0017570 A1 | 1/2006 | Moskowitz et al. | |
| 2006/0132313 A1 | 6/2006 | Moskowitz | |
| 2007/0040683 A1 | 2/2007 | Oliver | |
| 2007/0194926 A1* | 8/2007 | Bayley et al. ............... 340/572.1 |
| 2008/0296606 A1 | 12/2008 | Ottobon et al. | |
| 2010/0270373 A1* | 10/2010 | Poidomani et al. ........... 235/380 |
| 2010/0273469 A1 | 10/2010 | Seban et al. | |

FOREIGN PATENT DOCUMENTS

| | | |
|---|---|---|
| CN | 1414516 | 4/2003 |
| EP | 1918859 | 5/2008 |
| GB | 2407189 | 5/2008 |
| JP | 2006352574 | 12/2006 |
| WO | 2006031531 | 3/2006 |
| WO | 2009100005 | 8/2009 |

* cited by examiner

*Primary Examiner* — Michael G Lee
*Assistant Examiner* — Tabitha Chedekel
(74) *Attorney, Agent, or Firm* — Greer, Burns & Crain, Ltd.

(57) ABSTRACT

A device includes a main antenna suitable for capturing and transmitting an RF signal, at least one chip containing information and configured to transmit the information via the main antenna in response to an excitation of an external RF signal, and a mechanism for activating and deactivating the main antenna. The device further includes a detection circuit for detecting the presence of the external RF signal, and an indicator circuit, which is connected to the detection circuit so as to indicate the presence.

17 Claims, 2 Drawing Sheets

ACTIVATION AND INDICATION OF AN RF FIELD ON A DEVICE INCLUDING A CHIP

CROSS-REFERENCE

The present application is a 35 U.S.C. §371 National Stage application which claims priority to International Application No. PCT/FR2010/052601 filed on Dec. 2, 2010 under 35 U.S.C. §§119(a) and 365(b), which is incorporated by reference.

BACKGROUND

The present invention relates to an electromagnetic induction chip card including a device for activating and deactivating its RF radio frequency antenna. It finds a particularly interesting application, but not exclusively, in the radio frequency identification (RFID) technology. The invention relates in particular to an NFC type contactless chip card, Mifare, ISO 14443 or 15693, that is an RF antenna transmitting when it is located in a suitable electromagnetic field.

Generally, an RFID card includes one (or more) silicon electronic chips containing more or less sensitive information and relating to the cardholder. This RFID chip is generally connected to an antenna. The RFID card can have the conventional format of a chip card, but can also take different forms such as a badge, a tag, a keychain or other . . . . An integrated battery can be provided so as to extend the card functionalities.

RFID technology, based on the electromagnetic induction principle is increasingly widespread in everyday life. Initially used for managing stocks, this technology has been largely widespread in the access control field. It is rapidly growing in the passport and payment fields. In Japan, for example, it is commonly used as a payment means through the Felica protocol. In USA, the first payment terminals based on the ISO14443A protocol have already being launched. The launch in France is under way nowadays.

Unfortunately, this keen interest in this technology has been made to the detriment of security. The result is that an ill-intentioned person can freely access to information contained in an RFID chip. Given that an RFID chip becomes active in the presence of an electromagnetic field, it is sufficient to manufacture a powerful enough reader capable of recovering information contained in surrounding RFID chips.

Thus, it is possible to recover, without the holder's knowledge, the bank card number or any other personal information contained in a passport for example.

A simple solution is to make the RFID chip active only on the holder's initiative. Thus, the risk to recover data contained in the chip is dramatically reduced. A method is to place a switch at the antenna in order to switch off the communication when the RF exchanges are not necessary. This mechanism can be made in several ways.

Document US 2006/0017570 describes a system enabling the part corresponding to the transponder in an RFID chip or card to be mechanically activated or deactivated. This system relates in particular to cards including a RIFD chip as well as a magnetic tape. The system enables the wireless access to the RFID part to be blocked while allowing the magnetic operation. To block the access, this system proposes a magnetic protection means, a magnetic shield made of a material having a high relative magnetic permeability which is placed in front of or about the antenna so as to avoid any reception of foreign signals.

Document US 2006/132313 describes a first embodiment wherein the RFID chip is irreversibly destroyed or deactivated by physically detaching the antenna from the rest of the chip. A second embodiment is to dramatically reduce the operating range of the RFID antenna so that any access to the RFID chip should be made very closely, thus to the knowledge of the user. For that purpose, it is in particular provided to reversibly cover at least one part of the antenna with an insulation material sheet so as to dramatically limit the antenna performance.

Document WO 2006/031531 describes a system for activating and deactivating an RFID chip by connecting and disconnecting the antenna. For that purpose, a conducting tape is used which will connect the antenna with the RFID chip or not. This conducting tape can be controlled by a magnet. This document relates in particular to activating or activating an RFID chip from a deactivation device initially intended for an anti-theft tag.

Document EP1918859 describes a scrambling card to prevent a reader from reading data contained in an RFID chip for example. In this system, the RFID chip card is not modified, but a new scrambling card is added, which is intended to emit a signal to scramble reading of data contained in the RFID chip. This second scrambling card can be activated or deactivated by means of a mechanical or electronic switch such as a controlled transistor.

Document WO 2009/100005 describes a system for tuning or detuning the antenna of an RFID chip. This system includes a switch which modifies the antenna impedance such that when the switch is on the ON position, the impedance has a value for which the antenna is tuned and the transmission can occur. On the other hand, when the switch is on the OFF position, the antenna impedance has a value for which the antenna is detuned, which makes the signal transmission impossible.

SUMMARY

A first object of the invention is related to a precaution principle, that is reducing cards transmissions when they are in the vicinity of a reader electromagnetic field and thus reducing the RF wave pollution.

Another object of the invention is to provide alternative solutions enabling an antenna of an RFID card to be activated or deactivated.

At least one of the above mentioned objects is achieved by a device include
- a main antenna suitable for capturing and transmitting a radio frequency signal called RF signal, this signal is for example an electromagnetic field, an IR signal, a millimetric signal, a hyperfrequency signal for WIFI, GSM, UMTS or other,
- at least one chip containing information and configured to transmit this information via the main antenna in response to an excitation of an external RF signal, and
- a mechanism for activating and deactivating the main antenna; characterised in that the device further comprises:
- a detection circuit for detecting the presence of an external RF signal, and
- an indicator circuit, connected to the detection circuit, so as to indicate said presence.

The present invention is specially remarkable in that it has identified a new issue which is when the holder should activate his/her device which can advantageously be an RFID card. In systems of the prior art, to activate his/her RFID card, the holder had to make sure that he/she was in the presence of and close to an electromagnetic reader. For that purpose, he/she had for example to look for panels or any indication mentioning the presence of such a reader. Sometimes, there were people entitled to perform controls which signalled such a presence. Sometimes, even in the vicinity of a reader, no electromagnetic field was accessible in the card because this card was not close enough to the reader or quite simply, the reader was not operating.

With the device according to the present invention, it is the device which reports to the holder that the latter is in the presence of an RF signal or electromagnetic field. The holder can thus make the decision to activate his/her card or not. Any unnecessary manipulation of the device is avoided. Its lifetime is consequently extended.

According to a first alternative of the invention, the detection circuit and the indicator circuit are connected to said main antenna.

A second alternative provides that the detection circuit and the indicator circuit are connected to a secondary antenna independent of the main antenna. This secondary antenna can thus be specifically dimensioned to be used with the detection circuit.

The detection circuit and the indicator circuit can be powered through magnetic induction via the antenna with which they are connected. It can also be provided for the entire card or for the detection circuit and the indicator circuit only, an integrated battery or preferably a cell whether flexible or not, rechargeable or not. A solar connector can for example be contemplated to recharge a photovoltaic cell integrated in the device.

According to a characteristic of the invention, the activation and deactivation mechanism is a mono-stable mechanism for which the stable state corresponds to a deactivation state of the main antenna, and the unstable state corresponds to the momentary activation of the main antenna in response to an instruction. This instruction can be a user's finger on a push button to activate the antenna. If the user removes his/her finger, the push button comes back to its stable state which is an open circuit corresponding to the deactivation of the main antenna. An electronic instruction controlling a switch for a predetermined period can also be contemplated. The activated state of the main antenna is a state forced through the user's action.

Advantageously, the device includes a clock system, provided with a quartz for example, enabling a period to be defined for which the activation and deactivation mechanism maintains the main antenna into the activated state. An automatic standby is thus set up in order to prevent the user from unnecessarily maintaining the antenna into the activated state too long.

The activation and deactivation mechanism can advantageously include one or more of the following elements provided that the integration of several elements is not compatible:
  a push button which activates the main antenna when the button is depressed;
  a piezoelectric sensor which activates the main antenna when this piezoelectric sensor receives a predetermined wave; a temperature sensor, such as for example a heat solar collector which activates the main antenna when this heat sensor is lit; a light sensor such as a photodetector, a movement sensor such as an accelerometer, or a pressure sensor, other types of environmental sensors can be contemplated;
  a human-machine interface such as a keyboard enabling a pin code to be keyed so as to activate or deactivate the main antenna after processing the pin code;
  a human-machine interface such as an integrated biometric sensor enabling biometric data to be detected so as to activate or deactivate the main antenna after processing the biometric data; and
  an "on/off" type bistable switch which activates or deactivates the main antenna depending on the switch position.

According to an advantageous characteristic of the invention, the activation and deactivation mechanism includes a switch, such as one of the mechanisms described above, associated with an electronic component, the switch-electronic component assembly modifying the main antenna impedance so as to tune or detune the main antenna depending on the switch position. This embodiment enables the resonance frequency of the main antenna to be modified such that the RF signal emitted by the chip in response to an excitation is incomprehensible to any RF reader.

The electronic component can include at least one capacitor, at least one resistor or at least one inductor, provided in series, in parallel or in a circuitry suitable for disturbing the antenna impedance.

Advantageously, the indicator circuit includes audio and/or visual indicators. The audio indicators can emit a particular sound, a voice or music from a piezoelectric element. Visual indicators can include LEDs for Light Emitting Diodes.

Preferably, the device according to the invention further includes a state display system, such as LEDs, to indicate the state in which is located the device when it is activated, these states being:
  an RF transmission active state for a predetermined period of time,
  a dialogue state with an RF reader, and
  a non-dialogue state with the RF reader.

It can be contemplated one LED per state or one or more LEDs indicating several states through a colour change and/or a flashing frequency change.

According to the invention, information contained in the RFID chip include a random or dynamic type RF type signature for applications specially in payments, strong authentications on machines or computer networks, access controls . . . .

According to a non-limiting embodiment, the activation and deactivation mechanism and the detection circuit can be arranged such that the activation and deactivation mechanism only activates the main antenna on the double condition that it receives an activation instruction from the user and that the detection circuit reports the presence of an RF signal. Advantageously, when either of both conditions is no longer satisfied, the activation and deactivation mechanism automatically deactivates the main antenna. This can be implemented by an electronic processing circuit or by connecting in series the detection circuit and the activation and deactivation mechanism.

Of course, the different characteristics, forms and alternative embodiments of the invention could be associated with each other according to various combinations with the proviso that they are not incompatible or exclusive of one another.

BRIEF DESCRIPTION OF THE DRAWINGS

Further advantages and characteristics of the invention will appear upon reading the detailed description of an embodiment in no way limiting, and the appended drawings, wherein.

DETAILED DESCRIPTION

In FIGS. 1 to 4, different elements common to various alternatives or embodiments bear the same references. Embodiments described below relate to an RFID card, but the device according to the invention can be under different formats such as a USB key, an electronic tag, a medical patch or other.

Figure 1:
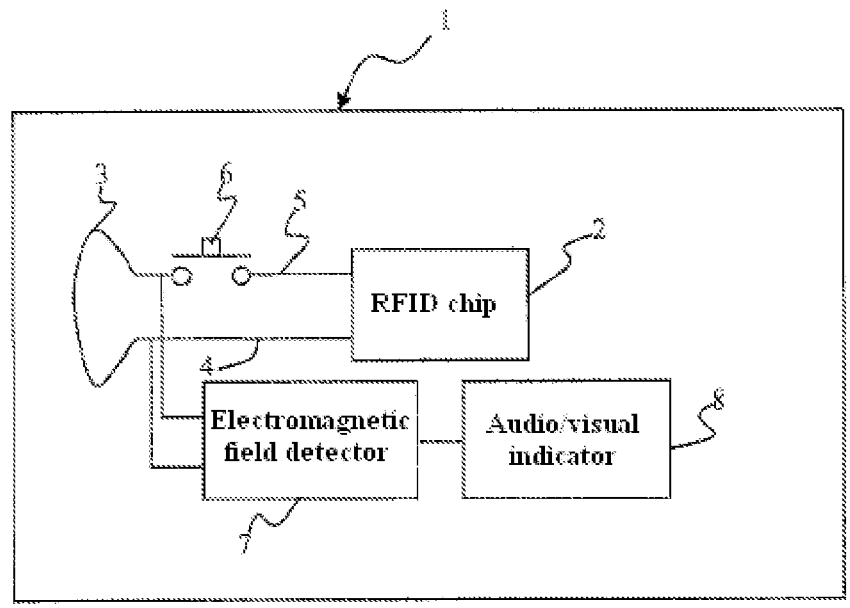
FIG. 1 is a schematic view of the internal electronics of an RFID chip card according to the invention with a detection circuit and a display circuit which are powered by the main antenna.

In FIG. 1, it can be seen an RFID chip card 1 containing an RFID tag or chip 2 wherein are stored sensitive information about the card user. This information is intended to be read by a remote RFID card reader by an electronic field. This RFID card can be passive, that is powered by exciting the magnetic field emitted by a close reader; active, that is provided with integrated power supply means; or semi-active, that is including means for powering a part only of the elements contained in the card.

The RFID card 1 of FIG. 1 is advantageously powered by the electromagnetic field from a reader. This energizing is made via the main antenna 3 which is also used as an RF transmission antenna for the sensitive information contained in the RFID chip 2.

The RFID chip 2 and the main antenna 3 are connected to each other by means:
- of a first permanent link 4 from a first end of the main antenna 3 to a first input of the RFID chip 2, and
- of a second interrupted link 5 from a second end of the main antenna 3 to a second input of the RFID chip 2.

The second link is interrupted by a push button 6 which makes up an activation and deactivation mechanism of the main antenna 3. The invention is specially remarkable in that in the idle state, the push button 6 is in the open position, which means that the antenna is not connected to the RFID chip 2 by both inputs. Thus, in the "normal" or idle state, the RFID chip 2 according to the invention, even located close to an electromagnetic reader, is unable to transmit any signal because its main antenna 3 is not active. Consequently, even if it is located in an environment close to a reader, the transmission of sensitive information requires an action of the user which therefore decides whether or not to communicate this sensitive information.

However, it is not always possible to realize that one is located close to an electromagnetic reader. Sometimes, it is desired to make sure that an identified electromagnetic reader is in the reading mode before transmitting any information to it and to avoid any unnecessary manipulation.

For that purpose, the present invention discloses an electromagnetic field detection circuit 7 for detecting the presence of an electromagnetic field in the environment of the RFID card 1. This circuit can be powered by an integrated battery but it is advantageously powered by the main antenna 3. In the presence of the electromagnetic field, the detection circuit 7 generates a presence signal to an indicator circuit 8 which can be a LED or a transducer transmitting a remarkable audio signal. The action of the indicator circuit 8 then alerts the user about the actual presence of an electromagnetic field. The user can then activate the push button 6 for allowing the transmission of sensitive information via the antenna 3.

Figure 2:
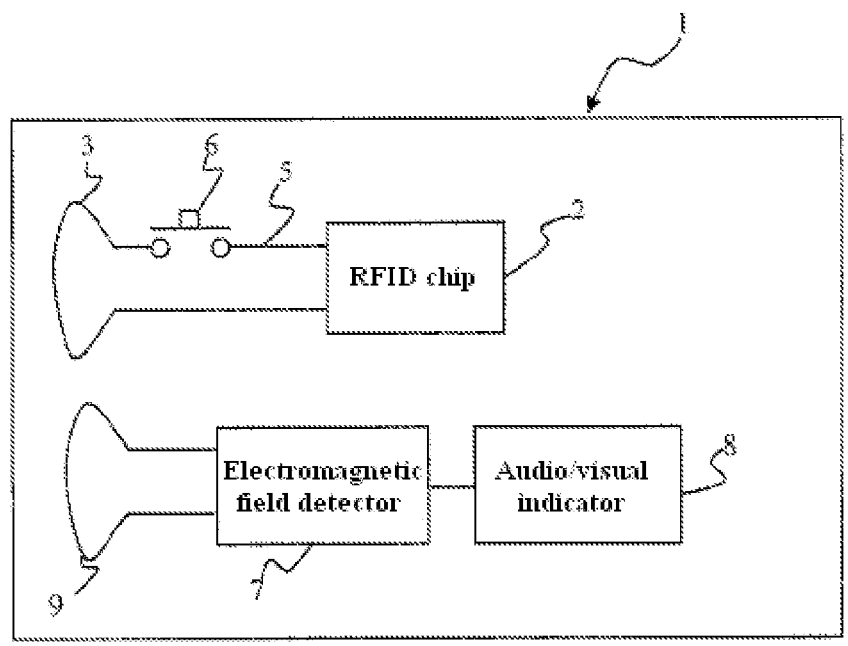
FIG. 2 is a schematic view of the internal electronics of an RFID chip card according to the invention with a detection circuit and a display circuit which are powered by an independent secondary antenna.

In FIG. 2 can be seen an alternative of the system of FIG. 1. The detection circuit 7 in FIG. 2 is connected to a secondary antenna 9 independent of the main antenna 3. Hence, such detection circuit 7 is not connected to the RFID chip 2 at any time.

The push button 6 can be replaced by any mechanical or electronic mechanism (controlled transistor) such as for example any mono-stable switch (coming back to its initial state in the absence of stress) or bistable (requiring a control to switch from one state to the other).

Figure 3:
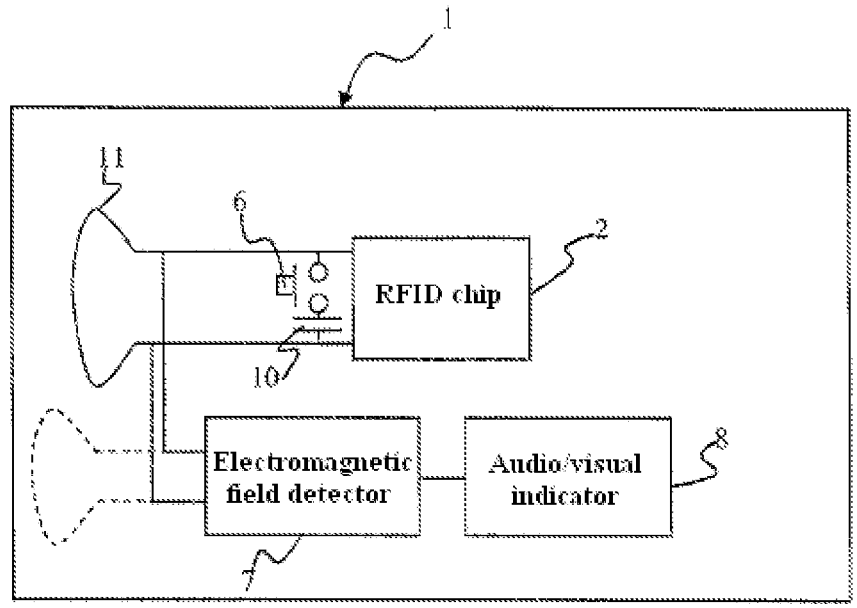
FIG. 3 is a schematic view of the internal electronics of an RFID chip card according to the invention with an activation and deactivation mechanism of the main antenna through impedance modification.

In FIG. 3 can be seen an exemplary embodiment of a card such as defined in FIG. 1 but with a push button which is replaced by a mechanism for tuning or detuning a main antenna 11. Rather than stopping the connection between the main antenna 3 and the RFID chip 2 as in FIG. 1, the impedance of the main antenna 11 is herein modified so as to make it inoperative, which corresponds to a deactivation state. More precisely, the main antenna 11 is dimensioned such that when it is directly connected across the RFID chip 2, the information from the RFID chip 2 is not properly transmitted to the extent that it is undetectable by any electromagnetic reader. The main antenna 11 is said to be detuned. In fact, its impedance is poorly dimensioned in direct connection. To tune the main antenna 11, a capacitor should be provided in parallel to the main antenna 11. Thus, the activation and deactivation mechanism of FIG. 3 includes a capacitor 10 in series with the push button 6, but the capacitor 10 and push button 6 assembly is provided in parallel to the main antenna 11.

When the push button is in the open position, the capacitor 10 has no real incidence. The main antenna 11 is then in direct connection with the RFID chip 2, and it is therefore in the deactivated or detuned state. Besides, when the user presses the push button 6 so as to put it in the closed position, the capacitor 10 is actually in parallel to the main antenna 11, and the latter is thus tuned and ready to properly transmit the sensitive information of the RFID chip 2. The embodiment of FIG. 2 is of course compatible with the embodiment of FIG. 3.

Figure 4:
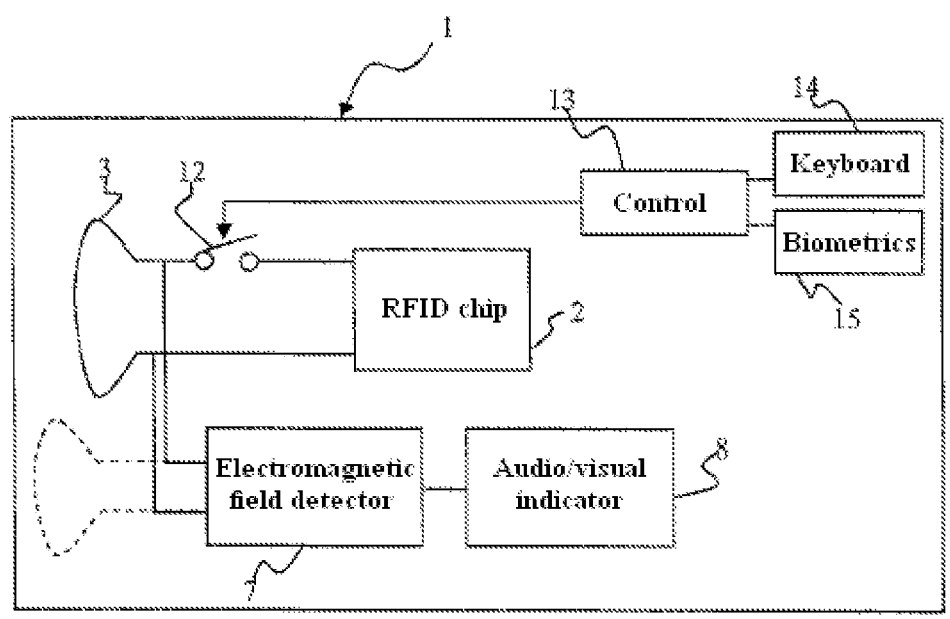
FIG. 4 is a schematic view of the internal electronics of an RFID chip card according to the invention with an activation and deactivation mechanism of the main antenna including a human-machine interface.

In FIG. 4, an exemplary embodiment can be seen where the push button is replaced in the embodiment of FIG. 1 by an activation and deactivation mechanism integrating human-machine interfaces. This activation and deactivation mechanism is compatible with the embodiments of FIGS. 2 and 3. A controlled switch 12 is distinguished, which is provided in the place where the push button was previously set. This switch is connected to a processing and controlling circuit 13 which performs comparative analyses between saved data and data from two human-machine interfaces 14 and 15. A comparative analysis consists in checking whether data from the human-machine interfaces 14 and 15 are valid in order to control the closing of the controlled switch 12. The human-machine interface 14 is a keyboard but can be any other interface type for keying data by the user. In particular, the user uses such an interface to key a secret PIN code enabling he/her to be identified by the processing and controlling circuit 13.

The human-machine interface 15 is a biometric circuit and its corresponding sensor. The user can thus be perfectly identified depending on his/her biological characteristics such as fingerprints, face features, etc. . . .

Of course, the invention is not limited to the examples just described and numerous alterations can be provided to these examples without departing from the scope of the invention. Therefore, it can be contemplated to apply the present invention to RFID cards including a battery and/or powered by electromagnetic induction. The present invention can also be applied to telemedicine where the device according to the invention is an adhesive or subcutaneous element suitable for transmitting pre-recorded information or detected information such as the heart rate of a user.

The invention claimed is:

1. A device comprising:
    a main antenna suitable for capturing and transmitting a radio frequency signal called RF signal,
    at least one chip containing information and configured for transmitting this information via the main antenna in response to an excitation of an external RF signal, and
    a mechanism for activating and deactivating the main antenna by selectively connecting and disconnecting an interrupted link between the main antenna and the at least one chip;
    a detection circuit for detecting the presence of the external RF signal, and
    an indicator circuit, connected to the detection circuit, so as to indicate said presence,
    the activation and deactivation mechanism and the detection circuit are arranged so that the activation and deactivation mechanism only activates the main antenna on the double condition that the indicator circuit receives an activation instruction from a user and that the detection circuit reports the presence of the external RF signal to the indicator circuit.

2. The device according to claim 1, wherein the detection circuit and the indicator circuit are connected to said main antenna.

3. The device according to claim 1, wherein the detection circuit and the indicator circuit are connected to a secondary antenna independent of the main antenna.

4. The device according to claim 1, wherein the detection circuit and the indicator circuit are powered by a cell whether flexible or not, rechargeable or not.

5. The device according to claim 1, wherein the activation and deactivation mechanism is a mono-stable mechanism for which the stable state corresponds to a deactivation state of the main antenna, and the unstable state corresponds to the momentary activation of the main antenna in response to an instruction.

6. The device according to claim 1, further including a clock system enabling a period of time to be defined for which the activation and deactivation mechanism maintains the main antenna into the activated state.

7. The device according to claim 1, wherein the activation and deactivation mechanism includes a push button which activates the main antenna when the button is depressed.

8. The device according to claim 1, wherein the activation and deactivation mechanism includes: a piezoelectric sensor which activates the main antenna when this piezoelectric sensor receives a predetermined wave, a temperature sensor, a light sensor, a movement sensor or a pressure sensor.

9. The device according to claim 1, wherein the activation and deactivation mechanism includes a human-machine interface such as a keyboard enabling a pin code to be keyed so as to activate or deactivate the main antenna after processing the pin code.

10. The device according to claim 1, wherein the activation and deactivation mechanism includes a human-machine interface such as an integrated biometric sensor enabling biometric data to be detected so as to activate or deactivate the main antenna after processing the biometric data.

11. The device according to claim 1, wherein the activation and deactivation mechanism includes an on/off type bistable switch which activates or deactivates the main antenna depending on the switch position.

12. The device according to claim 1, wherein the activation and deactivation mechanism includes a switch associated with an electronic component, the switch-electronic component assembly modifying the impedance of the main antenna so as to tune or detune the main antenna depending on the switch position.

13. The device according to claim 12, wherein the electronic component includes at least one capacitor, at least one resistor or at least one inductor.

14. The device according to claim 1, wherein the indicator circuit includes audio and/or visual indicators.

15. The device according to claim 1, wherein the device includes a state displaying system, such as LEDs, to indicate the state wherein the device is when activated, this state being:
    an RF transmission active state for a predetermined period of time,
    a dialogue state with an RF reader, and
    a non-dialogue state with the RF reader.

16. The device according to claim 1, wherein the information comprises a random or dynamic RF signature.

17. The device according to claim 1, wherein the device is under the format of a chip card, USB key or electronic tag.

* * * * *